United States Patent

[11] 3,628,873

[72] Inventor Ernst Leitz
 Wetzlar, Germany
[21] Appl. No. 13,058
[22] Filed Feb. 20, 1970
[45] Patented Dec. 21, 1971
[73] Assignee Ernst Leitz GmbH
 Wetzlar, Germany
[32] Priority Feb. 22, 1969
[33] Germany
[31] P 19 08 904.4

[54] METHOD OF CONTINUOUSLY DETERMINING THE DEGREE OF POLLUTION OF TRANSLUCENT LIQUIDS AND APPARATUS THEREFOR
5 Claims, 3 Drawing Figs.

[52] U.S. Cl. .................................................... 356/208,
 250/218
[51] Int. Cl. ................................................... G01n 21/26
[50] Field of Search ........................................... 356/196,
 197, 198, 208; 259/1, 72; 250/218

[56] References Cited
UNITED STATES PATENTS
2,814,575  11/1957  Lange ........................... 259/44 UX
3,535,159  10/1970  Shiro ............................ 310/8.7

Primary Examiner—Ronald L. Wibert
Assistant Examiner—Orville B. Chew, II
Attorney—Krafft & Wells ABSTRACT: A method of and apparatus for determining the degree of pollution of a liquid by causing the liquid to flow through a transparent vessel. A light beam is directed on the vessel and the intensity of the light is measured after the beam has passed through or is reflected from the liquid. Ultrasonic pressure waves are applied to the vessel and the liquid therein for keeping the walls of the vessel clean from dirt particles which otherwise may accumulate thereon.

ERNST LEITZ
INVENTOR

BY Krafft & Wells
ATTORNEYS 3,628,873

METHOD OF CONTINUOUSLY DETERMINING THE DEGREE OF POLLUTION OF TRANSLUCENT LIQUIDS AND APPARATUS THEREFOR

BACKGROUND OF THE INVENTION

The present invention relates to a method of and apparatus for continuously examining translucent liquids.

At the present time sewage from households and industrial establishments is highly polluted. Since this sewage is discharged into public bodies of water and rivers, there is a danger of excessive pollution of these waters and consequently increased risk of infection. Regulations have therefore been drawn up for the properties of sewage discharged into bodies of water. In accordance with these regulations, sewage is subjected to examinations, which include measurements to determine the degree of pollution.

Photometry is one of the methods of measurements used for this purpose. Sewage is passed through a flow vessel illuminated by a light source attached to its side. A photoelectric receiver disposed on the other side of the vessel senses the light conditions on the side of the vessel remote from the lamp and produces a current, which is proportional to the light transmittance of the sewage and which is indicated, its value being recorded. This recording is particularly useful when the pollution of the sewage is not constant but varies, for example with the time of day.

The reflection method and the diffraction method of measurement may be used instead of this transmitted light method.

If the pollution of the sewage is considerable, the vessel slowly but steadily becomes dirty as the sewage flows through it, so that with the passing of time increasing pollution of the sewage is wrongly indicated. It has therefore already been suggested to guide the sewage in a free fall through the measuring path. It is a disadvantage, however, that then the fluttering movement of the water causes an interfacing signal which proves especially obstructing when the degree of pollution is to be determined by the reflection method.

Another apparatus makes use of a vessel provided with a wiper. The wiper is actuated either by hand or automatically and cleans the wall portions of the vessel now and then from the accumulated dirt. But, of course, the wiper itself is subject to a certain wear and becomes dirty as the sewage flows through the vessel. This may also cause certain errors in measurement. Further, such apparatuses do not allow for a really continuous examination since every time the wiper wipes off the dirt particles the measurement must be interrupted for the wiping and for the time the dirt particles flow off.

It is therefore an object of the present invention to provide a method of and apparatus for determining the degree of pollution wherein the measurement is not obstructed by dirty walls of the vessel.

SUMMARY OF THE INVENTION

According to the present invention, this object is attained by a method of optically examining the pollution of liquids, comprising the steps of causing the liquid to be examined to flow through a substantially transparent vessel, directing a light beam onto the liquid in the vessel, measuring the intensity or diffraction of the beam after its engagement with the liquid in the vessel, and applying ultrasonic pressure waves to the liquid within the vessel.

According to a specific embodiment of the present invention, there is provided an arrangement for the optical examination of the translucency of liquids, comprising a vessel provided with inlet and outlet apertures and at least two substantially transparent wall portions, a light source for directing a beam through the substantially transparent wall portions and any liquid in the optical path therebetween, a light-responsive device for measuring the intensity of the beam after its passage through the vessels, and a generator of ultrasonic pressure waves coupled directly or indirectly to the contents of the vessel.

According to another embodiment of the invention, the vessel is mounted within a container, which is directly coupled to the generator and adapted to contain a liquid suitable for coupling the pressure waves to the vessel.

In a further embodiment of the invention, the generator is mounted within the vessel.

In an alternative embodiment of the invention, the arrangement comprises two generators of ultrasonic pressure waves, one generator being mounted within the vessel and the respective other one being mounted external thereto.

BRIEF DESCRIPTION OF THE DRAWINGS

The invention will be more readily comprehended from the following description when taken in conjunction with the appending drawings, wherein.

DESCRIPTION OF THE PREFERRED EMBODIMENTS

Figure 1:
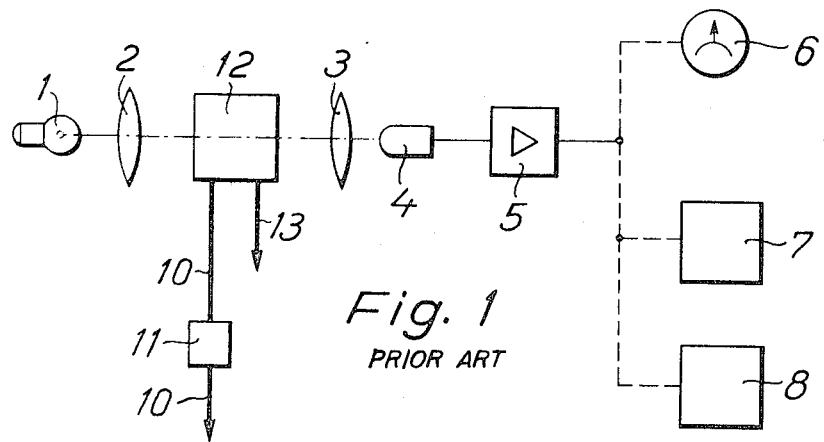
FIG. 1 is a schematic diagram of the general arrangement for the photometric examination of liquids.

Referring now to the drawings FIG. 1 illustrates the known arrangement for the photometric examination of a flowing liquid. In this arrangement, a lamp 1 illuminates through a condenser 2 a vessel 12 made of transparent material or provided with transparent windows on opposite sides. The portion of the illuminating beam which passes through the vessel is transmitted by a collecting lens 3 to a photoelectric transducer 4, the output signals of which pass through an amplifier 5 and are then indicated on an indicating instrument 6 and/or recorded by a recorder or in a tape store 7 and/or used to operate an alarm system 8. The vessel 12 is connected by a pipe 10 to a pump 11, which continuously sucks the liquid to be examined and forces it through the vessel. An outlet hose 13 is connected to the vessel. After calibration of the apparatus with the vessel filled with water or clean solvent, the signals obtained at the output of the photoelectric transducer are indicative of the degree of absorption of the liquid examined.

Figure 2:
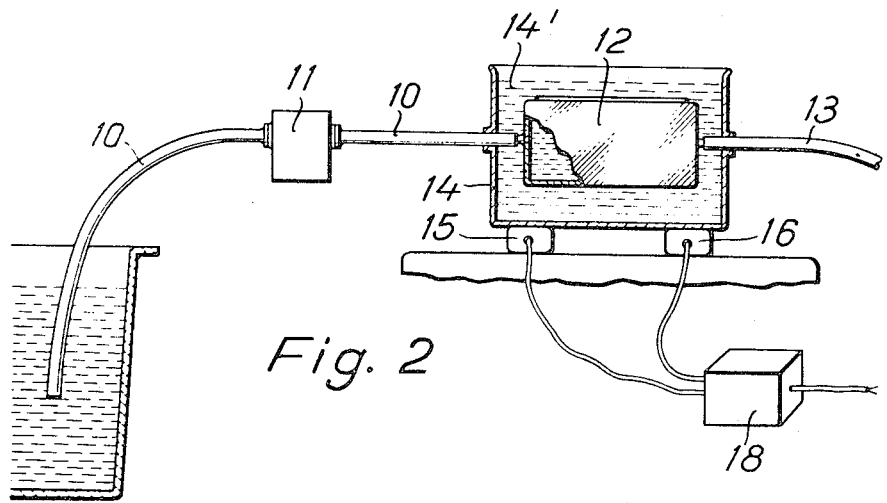
FIGS. 2 and 3 illustrate diagrammatically the essential parts of alternative embodiments of the present invention.

FIG. 2 shows details of an arrangement including ultrasonic generators. The liquid sucked through the pipe 10 by the pump 11 is passed into the vessel 12. The vessel is resiliently mounted in a tank and is surrounded by a suitable transmission liquid 14' having good light transmittance, for example water or carbon tetrachloride. The pipe 13 serves to discharge the liquid examined. The container 14 is, according to one embodiment of the invention, mounted on two ultrasonic generators 15 and 16, which are operated in phase at the same frequency. The generators are fed by an oscillator 18, which in turn receives its supply power from a source (not shown), for example an electric power mains supply.

Figure 3:
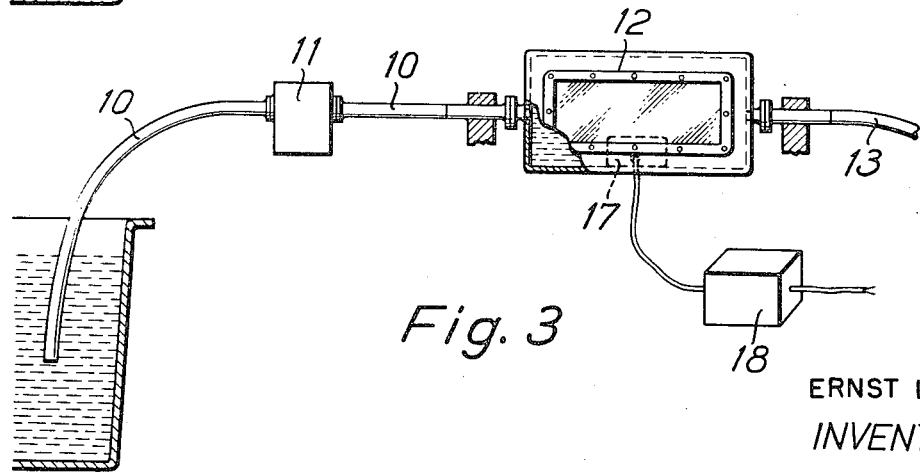

FIG. 3 illustrates an alternative embodiment in which the vessel 12 is freely mounted. In this case, an ultrasonic generator 17 is mounted in the container and the liquid to be examined is here itself used as transmission liquid for transmitting the vibrations to the windows of the vessel.

It is naturally also possible to combine the two possible arrangements illustrated for the ultrasonic generator, that is to say to dispose the latter in such a manner that action from both outside and inside is possible. The arrangement is then capable of universal application.

It is not essential for the purposes of the present invention, that the translucent windows of the vessel 12 be arranged on opposite sides thereof, provided there is an optical path between two substantially transparent wall portions of the vessel. For example, a single window may be provided together with a reflecting surface within the vessel to provide the optical path therethrough.

What is claimed is:

1. A method of continuously determining the degree of pollution of translucent liquids, comprising the steps of causing the liquid to be examined to flow through a substantially transparent vessel having transparent wall portions;

directing a light beam through the substantially transparent wall portions so as to be influenced by the liquid;

measuring the intensity of the light beam after its passage through the liquid; and applying ultrasonic pressure waves to said vessel and the liquid within said vessel to prevent the accumulation of particles on said transparent wall portions of the vessel and the resulting obstruction of said measuring.

2. An apparatus for continuously determining the pollution of translucent liquids comprising
   a. a transparent flow vessel having an inlet and an outlet;
   b. means for conducting a constant flow of the liquid to be examined through the vessel;
   c. a light source for illuminating the vessel;
   d. photoelectric receiving means for receiving the light beam emitted by the light source after being influenced by the liquid to be examined;
   e. means for indicating the current generated by the photoelectric receiving means; and
   f. at least one ultrasonic generator in functional connection with the vessel for applying pressure waves to the liquid within the vessel.

3. A device as claimed in claim 2, wherein said transparent flow vessel is mounted within a container filled with a fluid suitable for coupling the pressure waves to the vessel, said container being in mechanical connection with said ultrasonic generator.

4. A device as claimed in claim 2, wherein at least one said ultrasonic generator is mounted within the vessel.

5. A device as claimed in claim 2, comprising at least two ultrasonic generators, one of which is mounted within the vessel, the second one being mounted on the outside thereof.

* * * * *